United States Patent
Dunn, Jr. et al.

(10) Patent No.: US 10,723,477 B2
(45) Date of Patent: *Jul. 28, 2020

(54) AIRCRAFT REFUELING SAFETY SYSTEM

(71) Applicant: FlightLogix, LLC, Amarillo, TX (US)

(72) Inventors: Walter Lehmer Dunn, Jr., Amarillo, TX (US); Chad James Unrau, Amarillo, TX (US); Vernon Lee Tindell, Amarillo, TX (US); Thomas Walter Hanke, Amarillo, TX (US)

(73) Assignee: FlightLogix, LLC, Amarillo, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,628

(22) Filed: Feb. 22, 2019

(65) Prior Publication Data

US 2019/0185177 A1 Jun. 20, 2019

Related U.S. Application Data

(63) Continuation of application No. 15/657,025, filed on Jul. 21, 2017, now Pat. No. 10,239,630, which is a
(Continued)

(51) Int. Cl.
*B64D 37/32* (2006.01)
*B64D 37/16* (2006.01)
(Continued)

(52) U.S. Cl.
CPC .............. *B64D 37/32* (2013.01); *B64D 37/16* (2013.01); *B64F 1/28* (2013.01); *B67D 7/348* (2013.01)

(58) Field of Classification Search
CPC ........ G06Q 40/12; G06Q 30/06; G06Q 50/06; G06Q 50/10; G06Q 10/04; G06Q 20/322;
(Continued)

(56) References Cited

U.S. PATENT DOCUMENTS 5,913,180 A  6/1999 Ryan
8,567,723 B2  10/2013 Etzkorn et al.
(Continued)

FOREIGN PATENT DOCUMENTS

EP  2 581 309 A3  1/2018
GB  2 428 651 A  2/2007

OTHER PUBLICATIONS

Extended Search Report issued for European Patent Application No. 16737660.7, dated Jun. 25, 2018; 6 pages.

*Primary Examiner* — Seung H Lee
(74) *Attorney, Agent, or Firm* — Norton Rose Fulbright US LLP (57) ABSTRACT

A system ensures the correct type of fuel is dispensed in an aircraft while removing the introduction of human error in the refueling process. The system includes an RFID tag disposed at one or more aircraft that electronically stores data such as engine type, engine hours, fuel type, tail number, and pilot/subscriber data for the aircraft on which the RFID tag is disposed. An RFID reader is disposed at or near a fuel dispensing mechanism, such as a fuel truck or tank. A signal indicative of fuel type is emitted from the RFID tag to the RFID reader. RFID tags on aircraft that are enrolled in the system's subscription service enable aircraft to be recognized by a module operating the fuel dispensing mechanism. Based on a comparison performed by the module, authorization to begin fueling is either permitted or declined.

14 Claims, 4 Drawing Sheets

Related U.S. Application Data continuation of application No. 15/135,282, filed on Apr. 21, 2016, now Pat. No. 9,731,833, which is a continuation of application No. 14/594,974, filed on Jan. 12, 2015, now Pat. No. 9,340,298.

(51) Int. Cl.
*B64F 1/28* (2006.01)
*B67D 7/34* (2010.01)

(58) Field of Classification Search
CPC .. G06Q 20/327; G06Q 20/4012; G06Q 30/04; G06Q 50/28
See application file for complete search history.

(56) References Cited

U.S. PATENT DOCUMENTS

| | | |
|---|---|---|
| 8,763,956 B2 | 7/2014 | Beck |
| 2009/0315729 A1 | 12/2009 | Inhoffer |
| 2010/0228415 A1 | 9/2010 | Paul |
| 2012/0043425 A1 | 2/2012 | Beck |
| 2012/0173072 A1 | 7/2012 | Portocalis et al. |
| 2014/0110476 A1 | 4/2014 | Sheehan et al. |
| 2015/0199685 A1 | 7/2015 | Betancourt et al. |

AIRCRAFT REFUELING SAFETY SYSTEM

CROSS-REFERENCE TO RELATED APPLICATIONS

The present application is a continuation of U.S. patent application Ser. No. 15/657,025, filed Jul. 21, 2017, entitled "AIRCRAFT REFUELING SAFETY SYSTEM"; which is a continuation of U.S. patent application Ser. No. 15/135,282, filed Apr. 21, 2016, and issued on Aug. 15, 2017, as U.S. Pat. No. 9,731,833, entitled "AIRCRAFT REFUELING SAFETY SYSTEM;" which is a continuation of U.S. patent application Ser. No. 14/594,974, filed Jan. 12, 2015, and issued on May 17, 2016, as U.S. Pat. No. 9,340,298, entitled "AIRCRAFT REFUELING SAFETY SYSTEM," the disclosures of which are incorporated by reference herein in their entirety.

BACKGROUND

Aviation turbine fuels are used for powering jet and turbo-prop engine aircraft. There are two main grades of turbine fuel in use for United States civil commercial aviation: Jet A-1 and Jet A, both of which are kerosene-type fuels. Avgas is a gasoline fuel that is used for reciprocating piston engine aircraft. Avgas grades are defined by their octane rating. Two ratings are applied to aviation gasolines: lean mixture and rich mixture ratings. Currently, the two major grades in use are: Avgas 100LL and Avgas 100.

The introduction of turbine fuels into a reciprocating engine can have disastrous consequences. If this happens, the reciprocating engine aircraft will be able to operate for several minutes before a problem is realized. Often, this allows the aircraft to taxi, take off, and climb to significant altitude before engine failure. The severity is easily seen as fatalities directly result from the introduction of the incorrect type of fuel in such aircraft. As such, there is a great need to ensure that the wrong fuel is not introduced into a given type of aircraft.

SUMMARY

Accordingly, an aircraft refueling safety system is provided herein. The system comprises a module, which itself comprises a memory and one or more processors in communication with the memory. The one or more processors are configured to compare data wirelessly received from an RFID tag located at an aircraft to data manually entered by an operator. Each of the RFID tag data and the operator-entered data comprise data identifying the aircraft and the type of fuel required by the aircraft. The one or more processors are also configured to determine, based on the comparison, if the RFID tag data matches the operator-entered data. If the RFID tag data matches the operator-entered data, an enable signal is transmitted to allow fuel to be dispensed to the aircraft. On the other hand, if the RFID tag data does not match the operator-entered data, a disable signal is transmitted to prevent fuel from being dispensed to the aircraft.

In view of the foregoing, an RFID tag is disposed on an aircraft and transmits electronically-stored data including tail number, fuel type, aircraft performance history, maintenance data, and user account data to an RFID reader. The RFID reader ultimately transmits the data to a module.

The module receives the data from the RFID tag via the RFID reader, the same or similar data from an enterprise, and data manually entered by an operator. The enterprise may be a subscription-based enterprise that coordinates owner or operator account data with nodes within the system, including modules, RFID tags, and RFID readers. The operator also manually enters aircraft identification and fuel type data.

The module is programmed to determine whether the type of fuel required by an aircraft corresponds to the type of fuel present in the fuel dispensing mechanism, e.g., a fuel truck. Using data received from the RFID tag, the enterprise, and/or the operator, the module performs a comparison of the received fuel type data.

Based on the comparison, if the type of fuel in the fuel truck matches the type of fuel required by the aircraft (as read from the RFID tag, the enterprise data, and/or data manually input by an operator), the fuel is dispensed. On the other hand, if fuel type data received from the different sources do not match, then fuel is prohibited from being dispensed. In such case, an alarm may be activated to indicate that the type of fuel in the fuel truck does not match the type of fuel required by the aircraft. The alarm may include an audible and/or visual warning displayed to an operator, and a warning signal transmitted to the enterprise and/or owner or operator of the aircraft. Further, a cut-off system is activated that prevents dispensing the fuel.

DESCRIPTION OF THE FIGURES

For a more complete understanding of the concepts described herein, reference is now made to the following descriptions taken in conjunction with the accompanying drawings, in which.

DETAILED DESCRIPTION

A system is provided for ensuring the correct type of fuel is dispensed in an aircraft while removing the introduction of human error in the refueling process. The system includes an RFID tag disposed on one or more aircraft that electronically stores data such as engine type, engine hours, fuel type, tail number, and owner or operator data for the aircraft on which the RFID tag is disposed. An RFID reader is disposed at or near a fuel dispensing mechanism, such as a fuel truck or tank. A signal indicative of fuel type is emitted from the RFID tag to the RFID reader. RFID tags on aircraft that are enrolled in the system's subscription service enable aircraft to be recognized by a module operating the fuel dispensing mechanism. Based on a comparison performed by the module, authorization to begin fueling is automatically initiated, sparing the pilot from the process of swiping a card, paying with currency, or entering data on a keypad.

For a given aircraft, a module in communication with the RFID reader determines if fuel type data received from the RFID tag matches fuel type data manually input from an operator and/or received from another source. The module is also in communication with a pump or similar fuel dispensing mechanism and actuates or otherwise enables or disables the pump based on the determination. If the module determines that the fuel type data does not match, a warning is generated and the fuel dispensing mechanism is disabled. If the module determines there is a match, it transmits an enable signal to the fuel dispensing mechanism to allow fueling. Therefore, the system is safe and reliable as it removes or reduces human error from the refueling process, and ensures the correct fuel is dispensed to an aircraft.

According to another aspect, the module receives data relating to aircraft that are enrolled in a subscription service provided by an enterprise of the system. The owner or operator of an aircraft may participate in a subscription service whereby user account data is loaded into the system and distributed to a network of modules and network-based storage or servers for use. Account data may include billing or payment data, user preferences, and aircraft-specific data, such as tail number, fuel type, engine type, engineer hours, maintenance records, flight plans, and the like.

An enterprise that enables an owner or operator subscription services transmits owner or operator subscription data to the modules over a network. Accordingly, account services such as billing, etc., may be provided in addition to aircraft refueling safety services. Data relating to a given aircraft may be stored by the module for purposes of the comparison. Further, various types of data for a given aircraft may be updated at the module as it receives additional data from an enterprise controller. The module may distribute the updated data to other modules, the RFID tag, and the FBO.

Figure 1:
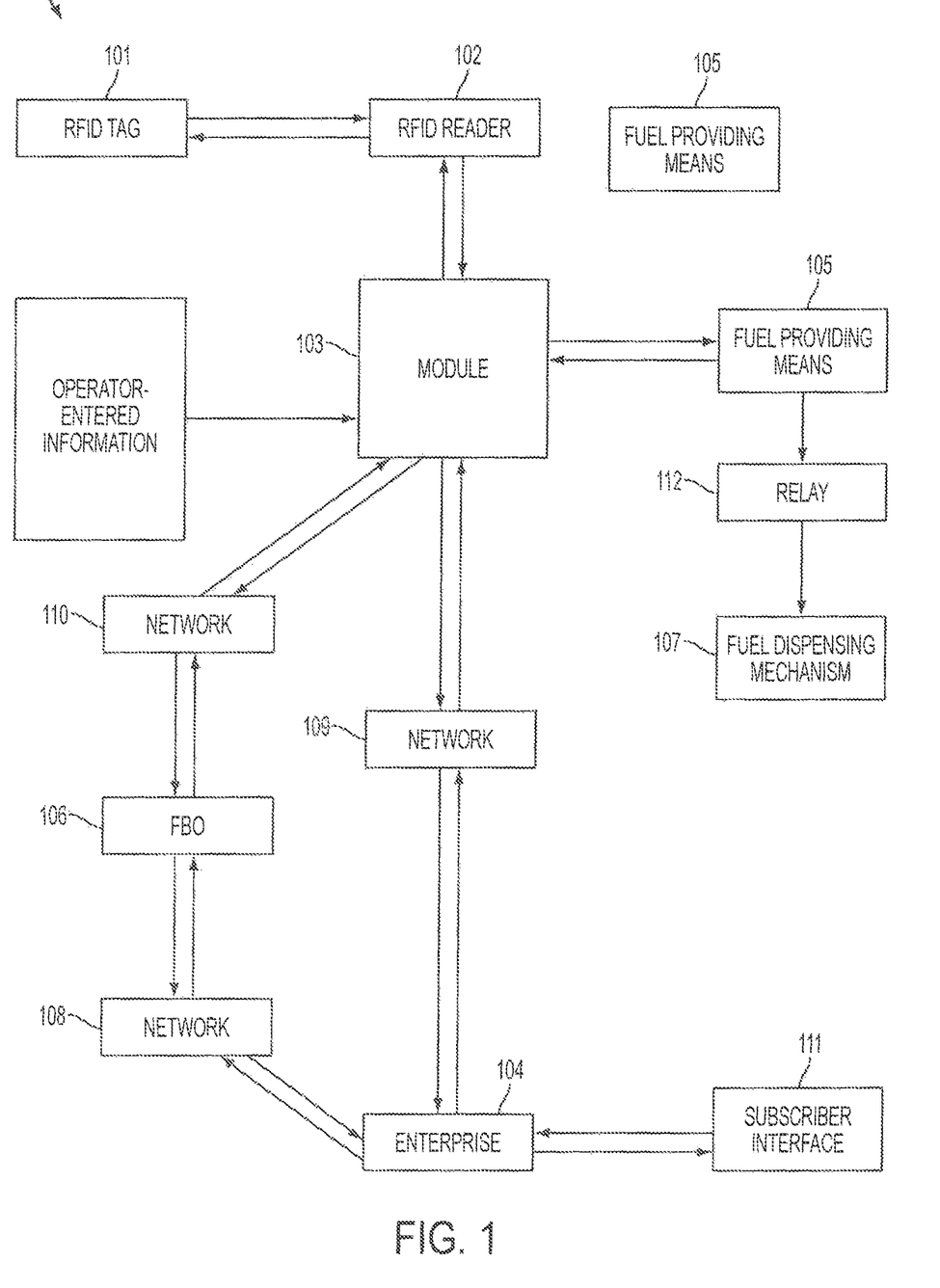
FIG. 1 illustrates an aircraft refueling system according to an embodiment.

FIG. 1 illustrates aircraft refueling safety system 100. An aircraft in system 100 is provided with RFID tag 101, which acts as a wireless based system and includes a transmitter that is adapted to transmit data from RFID tag 101 as a radio signal. RFID tag 101 is located on or within an aircraft and contains electronically-stored data including aircraft identification data and aircraft owner or operator identification data. Aircraft identification data may include, e.g., an aircraft identification number (e.g., tail number), aircraft fuel type, flight history or flight plan data, maintenance history data, and the like. Aircraft data in RFID tag 101 may also sufficiently identify the given aircraft as being owned and/or operated by a party that subscribes to aircraft refueling safety enterprise 104 that comprises system 100. Owner or operator identification data in RFID tag 101 may include, e.g., personal data, subscriber account data, payment data, and the like. By way of example, RFID tag 101 may transmit the type and amount of fuel dispensed to an aircraft so that a subscriber's account can be updated. This data can be transmitted to controls within the aircraft itself, e.g., to be used as a backup to current fuel storage tank measuring devices.

RFID tag 101 includes a memory for storing data and may be read only, or read/write operable, so that electronically stored data may be updated by writing data into the tag. This can be useful for updating data relating to the aircraft itself as well as the owner or operator. Preferably, RFID tag 101 is passive and does not require a battery. Rather, power is supplied to RFID tag 101 by RFID reader 102. When radio waves transmitted from RFID reader 102 are encountered by passive RFID tag 101, a coiled antenna within RFID tag 101 forms a magnetic field. The field operates to energize circuits in RFID tag 101 and allows it to send data encoded in its memory. Accordingly, during operation, RFID tag 101 collects energy from radio waves transmitted by RFID reader 102 and acts as a passive transponder to provide the electronically stored data to RFID reader 102. This avoids the need for an additional power source and allows RFID tag 101 to be smaller and cheaper. In other embodiments, RFID tag 101 may be powered by electromagnetic induction from magnetic fields produced near RFID reader 102, or include a local power source to increase the range at which RFID tag 101 and RFID reader 102 may communicate. Preferably, RFID reader 102 is configured so that it may detect the radio signal emitted by RFID tag 101 at any given orientation of the RFID reader 102 or polarization of the radio signal.

RFID tag 101 may be selected based on requirements of the aircraft and may be programmable. That is, RFID tag 101 may emit a fixed radio signal selected from a plurality of RFID tags 101 that each emit different signals and are integrally formed or affixed to aircraft corresponding to a certain fuel type. Alternatively, a general RFID tag 101 may be integrally formed or affixed to an aircraft and programmed to emit a certain frequency radio signal corresponding to a certain fuel type from a range of radio frequencies. With a programmable RFID tag 101, it may be reprogrammed at a later time, e.g., when an aircraft is upgraded to operate with a different fuel type. Also, a programmable RFID tag 101 can be programmed to transmit updated data relating to new maintenance data, new user account data, and the like.

RFID reader 102, which is in communication with module 103, is preferably located at or near fuel providing means 105, which itself may be a fuel truck, a tank, or the like. Fuel providing means 105 may comprise a main body which typically houses the components necessary for providing fuel and are dependent upon the type of fuel to be provided. The main body is not limited to any particular shape or construction. The main body may be fluidly coupled to a reservoir or the like containing the fluid-based fuel, and may include a fuel dispensing mechanism 107, e.g., pump that dispenses fuel from the main body of fuel providing means 105. Module 103 actuates or otherwise enables or disables fuel providing means 105 by transmitting an enable or disable signal based on the operations performed by module 103.

RFID reader 102 may be located near or at any position on fuel providing means 105, such as a handle or nozzle of pump 107. RFID reader 102 could, e.g., also be located on the main body or the fuel line of fuel providing means 105. Further, RFID reader 102 may be located internally to any of the above-mentioned components.

During operation of system 100 wireless modulated signals are bounced from RFID tag 101 to RFID reader 102, which detects the stored aircraft identification data and aircraft owner or operator identification data and extracts such data from the wireless data structure. The format of the data structure itself will depend on the communication schemed employed by RFID tag 101 and RFID reader 102. RFID reader 102 communicates this data to module 103, which coordinates aircraft refueling safety mechanisms described herein.

For a given aircraft, module 103 determines if fuel type data received from RFID tag 101 matches fuel type data manually input from an operator via a user interface and/or received from enterprise 104. Module 103 is also in communication with fuel dispensing mechanism 105 and actuates or otherwise enables or disables the dispensing of fuel to an aircraft based on the determination. That is, if module 103 determines that the fuel type data does not match, a warning is generated and the fuel dispensing mechanism, is disabled. If module 103 determines there is a match, it transmits an enable signal to fuel dispensing mechanism 105 to allow fueling.

Data relating to (1) an account belonging to an owner or operator enrolled in a subscription service provided by system 100, and (2) aircraft-specific data relating to the account is exchanged between module 103 and enterprise 104. Using the functionality provided by enterprise 104, an owner or operator of an aircraft may participate in a subscription service whereby user account and aircraft data is loaded into system 100 and distributed to a network of modules 103 and network based storage or servers for use. Account data may include billing or payment data, user preferences, and aircraft-specific data, such as tail number, fuel type, engine type, engineer hours, maintenance records, flight plans, and the like. Accordingly, data relating to an enrolled aircraft may be uploaded and stored in each module 103 within system 100 for purposes of fuel-type comparison. The various types of account and aircraft-specific data for an aircraft associated with an enrolled subscriber may be updated from time to time at each module 103, as additional data is provided by enterprise 104.

Enterprise 104 itself provides network and storage resources sufficient to interface with subscribers and communicate with each module 103 in system 100 and corresponding fixed-based operators (FBO) 106. Each FBO 106 in system 100 communicates with enterprise 104 and one or more modules 103 to facilitate sharing and updating data relating to an enrolled aircraft within system 100. As discussed herein, a given FBO 106 will typically communicate with enterprise 104 via a backhaul network and modules 103 located at the same airport as the given FBO 106 via a local network. By way of example, within system 100, enterprise 104 communicates with modules 103 and their corresponding FBOs 106 to share and update data relating to services such as fueling and maintenance for each aircraft associated with an enrolled subscriber. Subscribers exchange data with enterprise 104 at subscribe interface 111, which may be, e.g., an owner or operator computer, mobile device, or the like.

Enterprise 104 communicates with FBOs 106 over network 108 and a plurality of modules 103 over network 109, using one or a combination of wired, cellular, or local networks. Communication networks 108 and 109 may be distributed networks, having a plurality of base stations/eNodeBs that coordinate with one another to perform operations described herein. However, it will be understood by those of skill in the art that all or portions of networks 108 and 109 will comprise a centralized location (perhaps one of a base station/eNodeB, a controller, or enterprise) to enable the operations.

Communication networks 108 and 109 may be implemented using a number of wireless communication methods between FBOs 106 and corresponding modules 103 over network 110, and a combination of wireless and/or wireline communication methods between enterprise 104, FBOs 106 and modules 103. Such wireless methods include CDMA, TDMA, FDMA, OFDMA, and SC-FDMA schemes. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies described above, as well as other wireless networks and radio access technologies. Preferably, enterprise 104 communicates with FBOs 106 and/or modules 103 using LTE or LTE-A wireless communication methods coupled with short range wireless systems, including WiFi networks and the like, provided by FBO 106.

In view of the foregoing, RFID components in system 100 that wirelessly communicate with one another have a range of 20 to 300 feet. RF tag 101 and RF reader 102 preferably operate in common frequencies that (1) do not interference with other communication in the vicinity, and (2) do not require a license from the regulating government authorities, e.g., the Federal Communication Commission (FCC). According to one aspect, RF tag 101 and RF reader 102 may be pre-programmed to operate on these unlicensed bands and further function to detect interference and take appropriate steps to avoid such interference by e.g., scheduling communications during available time slots, utilizing different coding or modulation schemes, and switching channels for communication. So, while radio frequencies used in system 100 may vary, a specified band width or band widths may be pre-designated to avoid interference with communication between the aircraft and local networks. Further, RFID reader 102 and/or module 103 may further include interference detection and avoidance functionality, whereby, e.g., RFID reader 103 transmits RF tones to RFID tag 101 at different frequencies to avoid the detected interference. Accordingly, RFID tag 101 may be configured to respond at different frequencies.

Wireless communication can be accomplished with infrared transmitters and receivers, magnetic energy and the like. Otherwise, RFID tag 101 may operate from around 120 kHz up to 10 GHz depending upon their intended use and design specification. Other radio frequencies of operation are thought to include 30 kHz to 30 MHz, preferably a High Frequency (HF) signal, e.g. from 1 MHz to 15 MHz, more preferably from 12 MHz to 14 MHz, e.g. 13.56 MHz. Alternatively, the radio frequency used may be an Ultra High Frequency (UHF) signal, e.g. from 300 MHz to 3 GHz, preferably from 500 MHz to 1 GHz, more preferably from 750 MHz to 900 MHz, such as the 900 MHz ISM band.

According to one aspect, the frequency of signals transmitted from RFID tag 101 may correlate to the type of fuel required by the corresponding aircraft. For example, a radio signal of 300 kHz may correspond to a petrol powered aircraft, while a radio signal of 500 kHz may correspond to a diesel powered aircraft.

Figure 2:
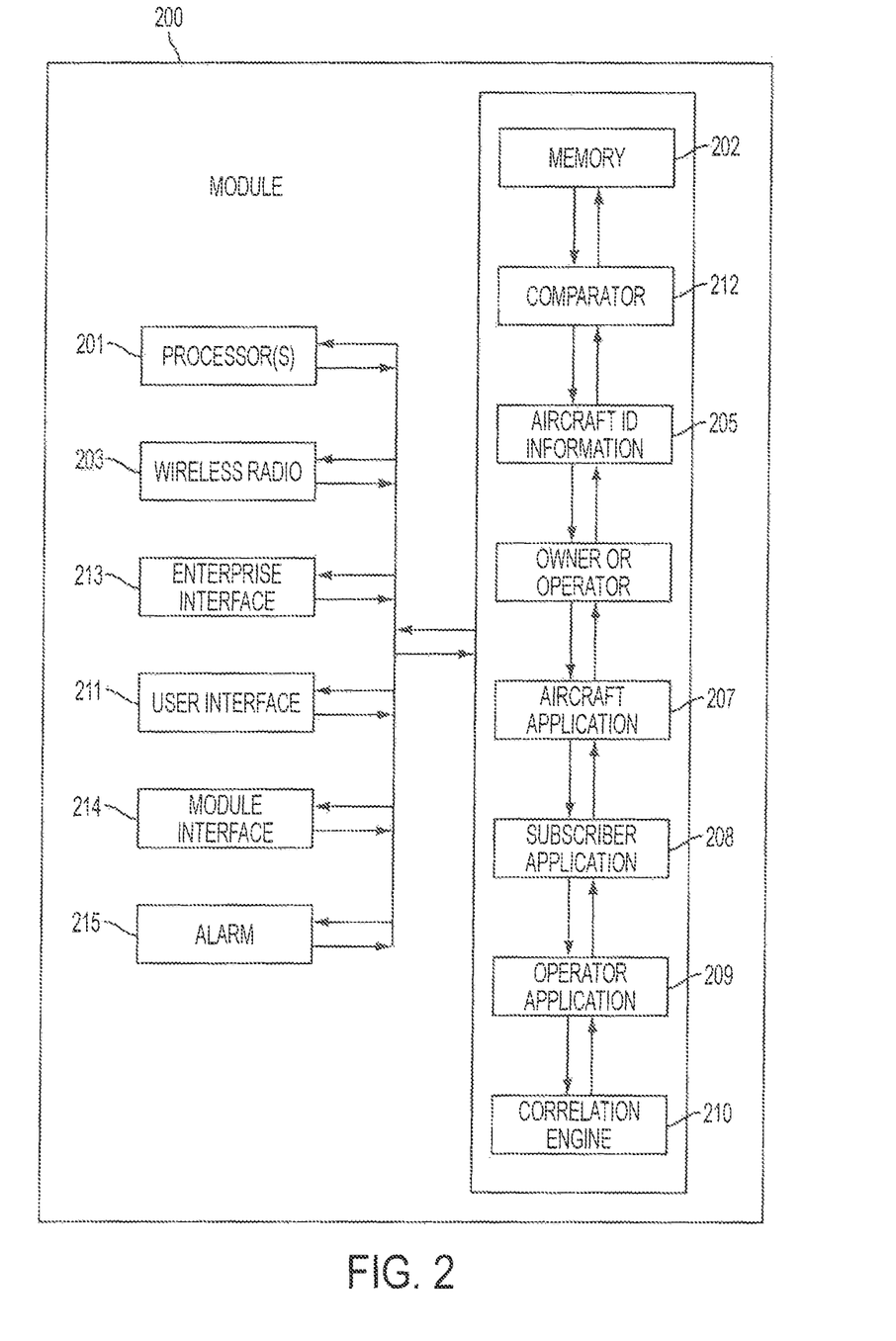
FIG. 2 illustrates components of a module that enables aircraft refueling safety according to an embodiment.

FIG. 2 illustrates, in more detail, components of a module that enables aircraft refueling safety according to the concepts described herein. Referring to FIG. 2, module 200 may correspond to module 103 illustrated in FIG. 1. Components of module 200 may comprise hardware, software, firmware, program code, or other logic (for example, ASIC, FPGA, etc.), as may be operable to provide the functions described herein. Module 200 comprises components that, when executing operations described herein, effectuate aircraft refueling safety mechanisms. Each of these components can be separate from, or integral with, module 200.

The functionality and operations of module 200 are controlled and executed through processor(s) 201 and specialized software executing thereon. Processor(s) 201 may include one or more core processors, central processing units (CPUs), graphical processing units (GPUs), math co-processors, and the like. Processor(s) 201 execute program logic, whether implemented through software stored in a memory 202 or in firmware in which logic is integrated directly into integrated circuit components. Module 200 may communicate wirelessly with other system components, such as multiple nodes comprising enterprise/service provider 104, multiple aircraft RFID tags 101, RFID readers 102, and fuel providing means 105 through various radios, such as wireless radio 203, such as one or more of wireless wide area network (WWAN) radios and wireless local area network (WLAN) radios. If a WWAN radio is included as one of the radios in wireless radio 203, communication would generally be allowed to communicate over a long range wireless communication network such as 3G, 4G, LTE, and the like. Various WLAN radios, such as WIFI™ radios, BLUETOOTH® radios, and the like, would allow communication over a shorter range. Module 200 may also provide communication and network access through a wired connection with network interface 204. The wired connection may connect to the public-switched telephone network (PSTN), or other communication network, in order to connect to the Internet or other accessible communication network.

Module 200 may include memory 202 that stores radio signals that are used to determine if the correct fuel is to be inserted into the aircraft. Memory 202 may be provided as a separate component and affixed to or formed integrally with module 200. The exact location of memory 202 is not limited and memory 202 may be provided with any form of communication means to communicate with RFID reader 102 and module 200. Indeed, memory 202 may be provided in a remote location, at e.g., enterprise 104, and simply communicate radio signals to comparator 212. Memory 202 may include any type of data storage means such as computer readable memory or the like.

Preferably, memory 202 stores aircraft identification data 205 and owner or operator identification data 206. Aircraft identification data 205 may include, e.g., an aircraft identification number (e.g., tail number), aircraft fuel type, flight history or flight plan data, maintenance history data, and the like. Aircraft identification data 205 may also sufficiently identify the given aircraft as being owned and/or operated by a party that subscribes to aircraft refueling safety enterprise/service provider. Owner or operator identification data 206 may include, e.g., personal data, subscriber account data, payment data, and the like.

Under control of processor(s) 201, program logic stored on memory 202, including aircraft application 207, subscriber application 208, operator application 209, correlation engine 210, and other applications are executed to provide the functionality of module 200, including communications, storage, computation, filtering, analysis, and correlation of aircraft data (including required fuel type) and subscriber data (including fuel type associated with an account), and transmitting data to system components to ensure aircraft refueling safety. Various operating applications may be displayed visually to the user via user interface 211. By way of example, user interface 211 presents user-facing data such as an indication of the type and amount of fuel currently supplied to, or being supplied to, a given aircraft. Other indicia for distinguishing fuel providing means 105 and an aircraft, such as numbers or letters, may also be provided.

User interface 211 includes various hardware and software applications that control the rendering of visual data onto the display screen of module 200 (not shown). User interface 211, under control of the processor(s) 201, controls and operates all forms of interfaces between the user and module 200. As such, when module 200 is implemented using a touch screen display, user interface 211 may read the user's input and finger motions on the touch screen and translate those movements or gestures into electronic interface commands and data entry. Various embodiments of user interface 211 also will render visual data through processing, controlled by processor(s) 201, and display that visual data on the display. During input to a touch screen device, user interface 211 may be receiving and analyzing input data from a user's finger movements and gestures on the display screen. User interface 211 may operate along with other peripheral input devices such as a keyboard, a mouse, a stylus, and the like.

Aircraft application 207 may configure processor(s) 201 to extract stored aircraft identification data 205 to effectuate operations described herein. Aircraft application 207 may be interfaced with subscriber application 208, operator application 209, and correlation engine 210 to correlate fuel type data between (1) aircraft identification data 205, (2) owner or operator identification data 206, and/or (3) data input by the operator. Correlating fuel type data received from RFID tag 101, enterprise 104, and from the operator adds redundant safety before a particular type of fuel is allowed to be dispensed to the given aircraft.

Subscriber application 208 may further configure processor(s) 201 to extract stored owner or operator data 206 to effectuate operations described herein. Subscriber application 208 may extract personal data, subscriber account data, payment data, and the like to correlate fuel type data as described herein. Subscriber application 208 may further read data received from enterprise 104 on a periodic basis and instruct processor(s) 201 to store updated or additional data as owner or operator data 206.

Operator application 209 may further configure processor(s) 201 to extract data manually received from an operator via user interface 211 to effectuate operations described herein. Execution of operator application 209 is optional. However, operation application 209 is preferably executed because it requires that operator data be manually input as a means to add redundant safety before the system or the operator allows a particular fuel type to be dispensed to a given aircraft.

Correlation engine 210 is preferably interfaced with aircraft application 207, subscriber application 208, and operator application 209 to correlate data received from the applications. Correlation engine 210 may configure processor(s) 201 to launch a comparison of fuel type data received from various sources in response to an operator selection to initiate a fuel type comparison and transmit an enable or disable signal based on the comparison. In some of these embodiments, processor(s) 201 may employ user interface 211 to receive operator input to and establish a connection with other system components to transmit the enable or disable signals. Further, correlation engine 210 may also cause a comparison to launch simply in response to detecting signals from one or more RFID tags 101 via RFID reader 102 or requests to launch a comparison from enterprise 104.

Module 200, under operation of correlation engine 210, may be further configured to transmit fuel type comparison results, as well as updated aircraft identification data 205 and owner or operator identification data 206 at predetermined intervals. Because this data may change over time, such updated data may be stored in RFID tags 101 and enterprise/service provider 104 to reflect changes to user accounts, aircraft records, and the like. Radio 203, module interface 204, and enterprise interface 213 may configure processor(s) 201 to establish a connection for module 200 and system components to transmit such data.

Preferably, correlation engine 210 comprises or operates in conjunction with comparator 212. Comparator 212 may be provided as a separate component and affixed to, or integrally formed with, module 200. As with memory 202, comparator 212 is provided with any form of suitable communication means so as to communicate with module 200, memory 202, the various applications and engines therein, fuel providing means 105, and alarm 215.

During operation, aircraft identification data 205 is received at RFID reader 102 from RFID tag 101 and is ultimately communicated to module 200. This data may be stored and otherwise processed or filtered by aircraft application 207. Also, owner or operator data 206 is received via enterprise interface 213. This data may be stored or otherwise processed or filtered by subscriber application 208. Data may also be manually input by an operator. This data may be stored or otherwise processed or filtered by operation application 209. Correlation engine 210, executing or operating with comparator 212, may call each of aircraft application 207, subscriber application 208, and operation application 209 to retrieve the needed data. In doing so, correlation engine 210 may compare aircraft identification data 205 (received from RFID reader 102) to (1) owner or operator identification data 206 (received from enterprise service provider 104 via enterprise interface 213), and/or (2) data manually entered by a system operator (received via user interface 211). As mentioned, module 200 preferably requires manual entry of fuel type data from a system operator as a means to ensure the operator is paying attention to the fuel to be dispensed.

According to an embodiment, the data compared by comparator 212 may be in the form of coded data that represents fuel type. Comparator 212 may compare the two codes and, if a match is found, module 200 transmits an enable signal to fuel providing means 105. The enable signal may be received at fuel providing means 105 and operate a circuit or other component, e.g., relay 112, to actuate fuel providing means 105 to allow fuel to be dispense to the aircraft. On the other hand, if comparator 212 determines the codes do not match, a disable signal operates on relay 112 to actuate fuel providing means 105 to prevent fuel from being dispensed to the aircraft.

Memory 202 and comparator 212 may communicate with alarm 215. Additionally, either one of the components may be integrally formed with module 200 and alarm 215. Alarm 215 is provided with suitable means to communicate with comparator 212. For example, this could include physically connecting alarm 215 to comparator 212 via electric wires or the communication link could be wireless. The communication link may be a one or two-way link, such that alarm 215 may communicate with comparator 212.

If the data compared by comparator 212 does not match, a warning will also be activated by alarm 215, alerting the operator of fuel providing mechanism 105 that they are using the wrong fuel for the aircraft. Alarm 215 generates a warning signal which is one of: a visual based signal; a sound based signal; a visual and sound based signal; a vibration based signal; a visual and vibration based signal; a sound and vibration based signal; and a visual, sound, and vibration based signal. In conjunction with activation of alarm 215, as discussed, module 200 also effectuates a physical block or prevention of the transfer of fuel. As such, the operator cannot simply ignore the warning signal, as the operator cannot refuel the aircraft until the correct fuel is provided.

Figure 3:
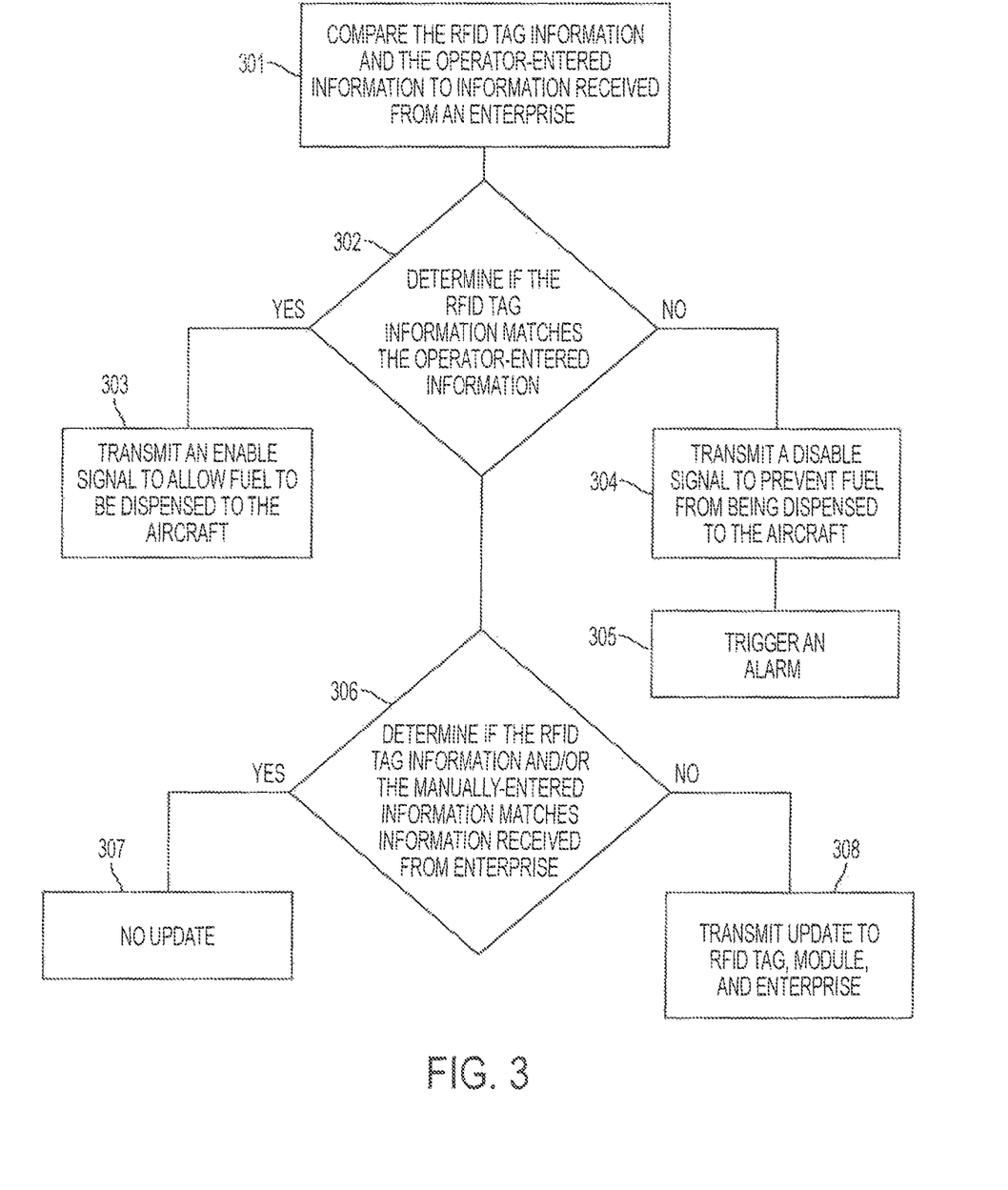
FIG. 3 illustrates functional blocks executed to perform an aircraft refueling safety method according to an embodiment.

FIG. 3 illustrates functional blocks executed to perform an aircraft refueling safety method according to the concepts described herein. Specifically, FIG. 3 illustrates functional blocks executed by a module such as module system 103 illustrated at FIG. 1 and/or module 200 illustrated at FIG. 2.

At step 301, the module compares data wirelessly received from an RFID tag located at an aircraft to data manually entered by an operator. Each of the RFID tag data and the operator-entered data may comprise data identifying the aircraft and the type of fuel required by the aircraft. As discussed, RFID tag data may be transmitted to module 300 when the RFID tag is activated. This may be done either passively or actively (via a battery or aircraft power supply). Once the RFID reader is within the transmitting range of RFID tag, the radio signal is detected by the RFID reader and communicated to module 300.

In performing the comparison, module 300 compares the radio signal received from the RFID tag to a predetermined radio signal assigned to the fuel dispensing mechanism. The predetermined radio signal may correspond to the type of fuel in the fuel dispensing mechanism. That is, the predetermined radio signal may be set to a specific frequency or type of signal that corresponds to the fuel in the fuel dispensing mechanism. For example, the predetermined radio signal may include a plurality of signals or include a frequency band of acceptable radio signal frequencies or the like. This could include estimating an error (e.g., the frequency of the radio signal is within 10% of the frequency of the predetermined radio signal) or checking that the radio signal, or frequency thereof, lies in an acceptable frequency band. This may be particularly useful in a retrofit system or the like.

It should also be appreciated that module 300 may also compare the RFID tag data and/or the operator-entered data to data received from an enterprise. The enterprise data may also include data identifying the aircraft and the type of fuel required by the aircraft. Ultimately, the comparison between the radio signal received from the RFID tag and the predetermined radio signal associated with the fuel dispensing mechanism is utilized to make decisions and take further action, as discussed herein.

At step 302, the module determines if the RFID tag data matches the operator-entered data. The determination is based on the comparison performed at step 301. That is, module 300 determines whether or not fuel dispensing mechanism dispenses the correct fuel by analyzing and comparing the radio signal to the predetermined signal. In the event enterprise data is received, module 300 also determines if the enterprise data matches the RFID tag data and the operator-entered data.

At step 303, if the RFID tag data matches the operator-entered data, module 300 transmits an enable signal to allow fuel to be dispensed to the aircraft. In this case, fueling is allowed to proceed. According to an embodiment, step 303 may result in no action being taken as the fuel in the fuel dispensing mechanism is determined to be valid. That is, the fuel dispensing mechanism is determined to provide the correct type of fuel to the aircraft, and the provision of fuel from the fuel dispensing mechanism is allowed to proceed according to standard fueling procedure. In this embodiment, no warning is generated and the operator simply operates the fuel dispensing mechanism as appropriate; for example, by operating the fuel pump. Fuel is therefore able to pass from the nozzle of the fuel dispensing mechanism 10 to the fuel tank of the aircraft via the fuel line. The pump itself may or may not be activated prior to the compression of a trigger. In other words, the trigger may control the flow of fuel to the aircraft, and may also include operation (i.e., activation) of the pump.

At step 304, if the RFID tag data does not match the operator-entered data, module 300 transmits a disable signal to prevent fuel from being dispensed to the aircraft. The disable signal may be sufficient to mechanically actuate fuel dispensing components to prevent them from being able to dispense fuel. Further, the disable signal may effectuate a visual and/or audio alarm.

At step 305, module 300 triggers an alarm if the fuel types do not match. The alarm is triggered in response to the determination made at step 302. The alarm, which may comprise a visual and/or audio alarm, may be displayed to an operator via the module's interface, and transmitted to the enterprise and/or the owner operator.

According to an embodiment, module 300 compares the detected radio signal and determines the level of correspondence, which is then transmitted to an alarm unit. If the alarm unit is positioned at module 300, then module 300 may further comprise a transmitter and/or an encoder or modulator for communication with the alarm unit. In this regard, module 300 may transmit the radio signal or determination of correspondence over a distance greater than the transmitting range between the RFID tag and the RFID reader.

As such, at step 306, module 300 compares the RFID tag data to data received from an enterprise. In at least one embodiment, module 300 may also compare the operator-entered data to data received from the enterprise. As mentioned, the enterprise data may include data identifying the aircraft and the type of fuel required by the aircraft. It should also be appreciated that the RFID tag data and the enterprise data may also include account data relating to an owner or operator of the aircraft. This data may be compared to determine if data stored within the RFID, the manually entered data, and the data and provided by the enterprise are current. If the data matches, at step 307, it is determined that no update is need. If the data does not match, at step 308, an update is transmitted to at least one of the RFID tag, the module for display to the operator, and the enterprise, depending on which data source is not current.

Further, module 300 may store data relating to the amount of fuel dispensed and other data read from the RFID tag. Module 300 may further operate to communicate such data to the enterprise as a means of providing real-time, or iterative, updates for account data at the enterprise itself.

Figure 4:
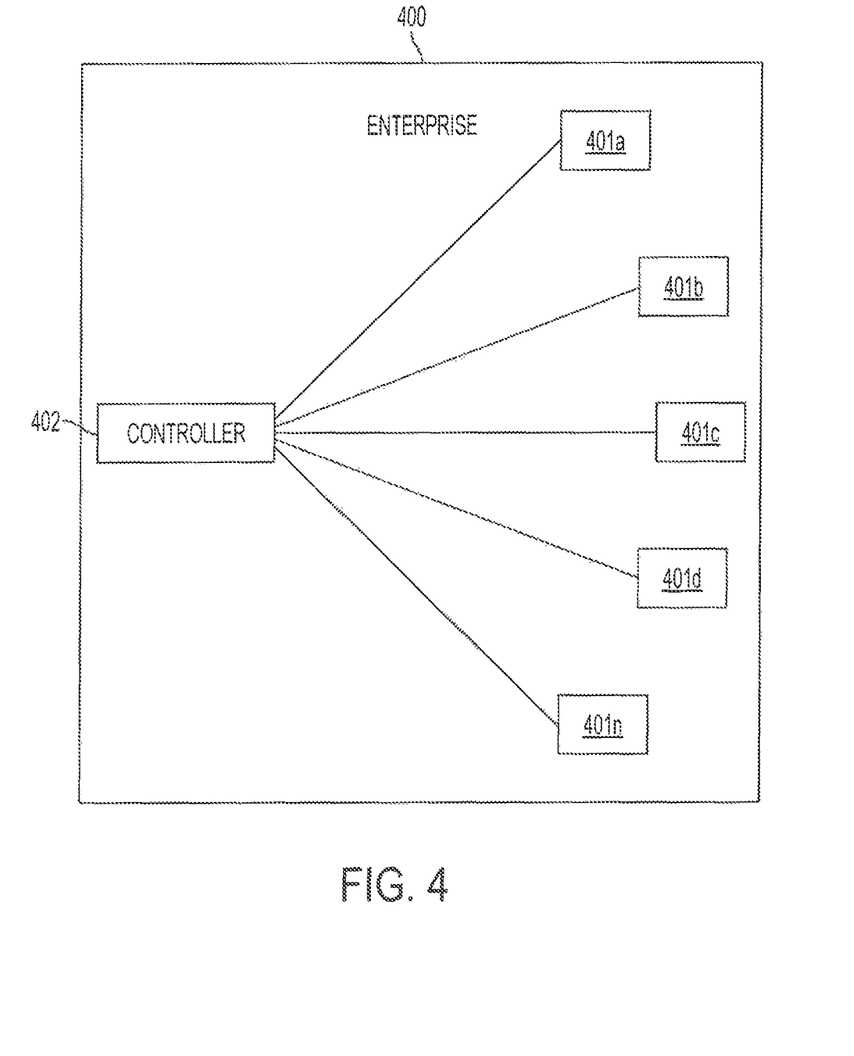
FIG. 4 illustrates components of an enterprise that enables owners/operators of an aircraft to establish accounts and associate aircraft with such accounts for the purposes of ensuring aircraft refueling safety according to an embodiment.

FIG. 4 illustrates components of an enterprise that enables owners/operators of an aircraft to establish accounts and associate aircraft with such accounts for the purposes of ensuring aircraft refueling safety according to the concepts described herein. Referring to FIG. 4, enterprise 400 may correspond to enterprise 104 illustrated in FIG. 1. Components of enterprise 400 may comprise hardware, software, firmware, program code, or other logic (for example, ASIC, FPGA, etc.), as may be operable to provide the functions described herein.

Enterprise 400 provides an interface with end users to create subscription accounts, store and update account data, and communicate account data to FBOs 106 and/or modules 103 within system 100. Accordingly, enterprise 400 includes at least end user network nodes 401a-401n and one or more controllers 402. Controllers 402 may comprise processors, storage, and communication components to provide the functionality described herein. By way of example, controller 402 may leverage local storage, cloud storage, and distributed components across one or more networks.

During operation, enterprise 400 may receive transaction data from modules 103, update user accounts to reflect the transaction data, and distribute the updated data across system 100. Further, enterprise 400 may include a fuel-payment solution that can be used in refueling safety system 100 to pay for fuel purchases. Enterprise 400 preferably provides its own payment-based software, which is linked to the a point-of-sale (POS) system installed in modules 103, allowing users to be billed by enterprise 400. RFID tag 101 may be encoded with a list of credentials indicating the billing history, account data, user preferences, and the like. As such, if a pilot or user were to pay via their subscriber account, that data, along with the RFID tag 101 number would be routed through module 103 to enterprise 400.

The invention claimed is:

1. An aircraft refueling safety module comprising:
   a memory, and
   one or more processors in communication with the memory, the one or more processors configured to:
      compare data wirelessly received from a first data source comprising at least one aircraft data source, the aircraft data source data comprising at least one of:
         data identifying the aircraft, and
         a type of fuel required by the aircraft;
      to data received from a second data source comprising at least one data source not located at the aircraft, the second data source data comprising at least one of:
         data identifying the aircraft, and
         the type of fuel required by the aircraft;
      determine, based on the comparison, if the first data source data matches the second data source data; and
      if the first data source data matches the second data source data, allow fuel to be dispensed to the aircraft and store, in the memory, data comprising at least one of data indicating the type of fuel dispensed to the aircraft or the amount of fuel dispensed to the aircraft, or
      if the first data source data does not match the second data source data, prevent fuel from being dispensed to the aircraft.

2. The aircraft refueling safety module of claim 1 where the one or more processors is further configured to:
   compare the aircraft data source data and the second data source data to data received from an enterprise, the enterprise data comprising at least one of:
      data identifying the aircraft, and
      the type of fuel required by the aircraft;
   determine, based on the comparison, if the enterprise data matches the aircraft data source data and the second data source data; and
   if the enterprise data matches the aircraft data source data and the second data source data, allow fuel to be dispensed to the aircraft, or
   if the enterprise data does not match the aircraft data source data and the second data source data, prevent fuel from being dispensed to the aircraft.

3. The aircraft refueling safety module of claim 2 where the one or more processors is further configured to:
   enable, if the enterprise data does not match the aircraft data source data and the second data source data, an operator alarm signal.

4. The aircraft refueling safety module of claim 2 where the aircraft data source data further comprises account data relating to an owner or operator of the aircraft and the enterprise data further comprises account data relating to the owner or operator of the aircraft.

5. The aircraft refueling safety module of claim 4 where the one or more processors is further configured to:
   compare the aircraft data source data relating to the owner or operator of the aircraft to the enterprise data relating to the owner or operator of the aircraft;
   determine, based on the comparison, if the aircraft data source data relating to the owner or operator of the aircraft or the enterprise data relating to the owner or operator of the aircraft must be updated; and
   if an update is required, transmit the updated data to at least the at least one aircraft data source or the enterprise.

6. The aircraft refueling safety module of claim 1 where the one or more processors is further configured to:
   enable, if the first data source data does not match the second data source data, an operator alarm signal.

7. The aircraft refueling safety module of claim 1 where the one or more processors is further configured to:
   transmit the data indicating the type and amount of fuel dispensed to an enterprise.

8. An aircraft refueling safety method, the method comprising:
   comparing, at one or more modules, data wirelessly received from a first data source comprising at least one aircraft data source, the aircraft data source data comprising at least one of:
      data identifying the aircraft, and
      a type of fuel required by the aircraft
   to data received from a second data source comprising at least one data source not located at the aircraft, the second data source data comprising at least one of:
      data identifying the aircraft, and
      the type of fuel required by the aircraft;
   determining, at the one or more modules, based on the comparison, if the first data source data matches the second data source data; and
   if the first data source data matches the second data source data, allowing fuel to be dispensed to the aircraft and storing, in the memory, data comprising at least one of data indicating the type of fuel dispensed to the aircraft or the amount of fuel dispensed to the aircraft, or
   if the first data source data does not match the second data source data, preventing fuel from being dispensed to the aircraft.

9. The aircraft refueling safety method of claim 8 further comprising:
   comparing, at the one or more modules, the aircraft data source data and the second data source data to data received from an enterprise, the enterprise data comprising at least one of:
      data identifying the aircraft, and
      the type of fuel required by the aircraft;
   determining, at the one or more modules, based on the comparison, if the enterprise data matches the aircraft data source data and the second data source data; and
   if the enterprise data matches the aircraft data source data and the second data source data, allowing fuel to be dispensed to the aircraft, or
   if the enterprise data does not match the aircraft data source data and the second data source data, preventing fuel from being dispensed to the aircraft.

10. The method of claim 9 further comprising:
    enabling, if the first data source data does not match the second data source data, an operator alarm signal.

11. The aircraft refueling safety method of claim 9 further comprising:
    enabling, if the enterprise data does not match the aircraft data source data and the second data source data, an operator alarm signal.

12. The aircraft refueling safety method of claim 9 where the aircraft data source data further comprises account data relating to an owner or operator of the aircraft and the enterprise data further comprises account data relating to the owner or operator of the aircraft.

13. The aircraft refueling safety method of claim 12 further comprising:
    comparing, at the one or more modules, the aircraft data source data relating to the owner or operator of the aircraft to the enterprise data relating to the owner or operator of the aircraft;
    determining, at the one or more modules, based on the comparison, if the aircraft data source data relating to the owner or operator of the aircraft or the enterprise data relating to the owner or operator of the aircraft must be updated; and
    if an update is required, transmitting the updated data to at least the at least one aircraft data source or the enterprise.

14. The aircraft refueling safety method of claim 8 further comprising:
    transmitting, from the one or more modules, the data indicating the type and amount of fuel dispensed to an enterprise.

* * * * *